United States Patent
Shanmuganathan et al.

(10) Patent No.: US 10,397,131 B2
(45) Date of Patent: Aug. 27, 2019

(54) METHOD AND SYSTEM FOR DETERMINING BANDWIDTH DEMAND

(71) Applicant: VMware, Inc., Palo Alto, CA (US)

(72) Inventors: Ganesha Shanmuganathan, Mountain View, CA (US); Jean-Pascal Billaud, Walnut Creek, CA (US); Kalyan Saladi, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 214 days.

(21) Appl. No.: 14/481,849

(22) Filed: Sep. 9, 2014

(65) Prior Publication Data

US 2016/0072723 A1 Mar. 10, 2016

(51) Int. Cl.
*H04L 12/917* (2013.01)
*G06F 9/455* (2018.01)
*H04L 29/06* (2006.01)
*H04L 12/801* (2013.01)

(52) U.S. Cl.
CPC .......... *H04L 47/76* (2013.01); *G06F 9/45558* (2013.01); *H04L 69/163* (2013.01); *G06F 2009/45595* (2013.01); *H04L 47/193* (2013.01)

(58) Field of Classification Search
CPC .............................. H04L 47/76; G06F 9/45558
USPC ......................................................... 709/226
See application file for complete search history.

(56) References Cited

U.S. PATENT DOCUMENTS

| | | | | |
|---|---|---|---|---|
| 6,934,256 B1 * | 8/2005 | Jacobson | ................. | H04L 43/00 370/235 |
| 8,804,508 B1 * | 8/2014 | Hobbs | ................. | H04N 21/2402 370/230 |
| 2002/0159390 A1 * | 10/2002 | Wen | ................. | H04L 43/0829 370/235 |
| 2005/0083849 A1 * | 4/2005 | Rui | ................. | H04L 43/0882 370/252 |
| 2006/0114830 A1 * | 6/2006 | Shimonishi | ............. | H04L 1/187 370/241 |
| 2008/0091777 A1 * | 4/2008 | Carlos | ................. | G06Q 10/10 709/204 |
| 2011/0299537 A1 * | 12/2011 | Saraiya | ............... | H04L 61/2596 370/392 |

(Continued)

OTHER PUBLICATIONS

H. Wang, H. Xin, D. Reeves, and K. Shin, "A simple refinement of slow-start of TCP congestion control," Proceedings of Fifth IEEE Symposium on Computers and Communications (ISCC 2000). IEEE, Jul. 2000, pp. 98-105.*

(Continued)

*Primary Examiner* — Nicholas R Taylor
*Assistant Examiner* — Meng Vang
(74) *Attorney, Agent, or Firm* — Loza & Loza, LLP

(57) ABSTRACT

A method, a non-transitory computer-readable storage medium, and a computer system for managing bandwidth allocated to a virtual machine running on a host computer is disclosed. In an embodiment, a method involves obtaining the current bandwidth for a virtual machine running on a host computer, determining bandwidth demand for the virtual machine as a function of the current bandwidth and a growth margin, and adjusting a bandwidth cap for the virtual machine based on the determined bandwidth demand. In an embodiment, when applied, the technique allows for bandwidth to be allocated to the virtual machines without the sum of allocated bandwidth exceeding a global bandwidth cap.

27 Claims, 8 Drawing Sheets

(56) References Cited

U.S. PATENT DOCUMENTS

| | | | | |
|---|---|---|---|---|
| 2013/0254767 A1* | 9/2013 | Mizuno | ............... | G06F 9/455 |
| | | | | 718/1 |
| 2013/0298123 A1* | 11/2013 | Zuo | ............... | H04L 47/20 |
| | | | | 718/1 |
| 2013/0318522 A1* | 11/2013 | Devireddy | ......... | H04L 12/6418 |
| | | | | 718/1 |
| 2014/0258535 A1* | 9/2014 | Zhang | ............ | H04L 41/0806 |
| | | | | 709/226 |
| 2015/0029864 A1* | 1/2015 | Raileanu | ........... | H04L 47/122 |
| | | | | 370/237 |
| 2015/0188830 A1* | 7/2015 | Zhao | ............ | H04L 47/27 |
| | | | | 370/235 |

OTHER PUBLICATIONS

Jacobson, V. et al.; "Congestion Avoidance and Control", pp. 1-25; Nov. 1988.

\* cited by examiner

METHOD AND SYSTEM FOR DETERMINING BANDWIDTH DEMAND

BACKGROUND

Virtual machine (VM) networks formed by host computers connected over the Internet protocol suite known as "Transmission Control Protocol/Internet Protocol" (TCP/IP) can be used to implement software defined data centers (SDDCs). Typically, VMs running on a host computer in a SDDC share common resources (e.g., memory, CPUs, or pNIC bandwidth) by treating the resources of the host computer as a resource pool and allocating resources from the resource pool to individual VMs as needed based on demand. For example, several VMs running on a host computer will each be allocated a portion of the processing power from a resource pool based on the demand for each VM. While allocating shared resources to VMs based on demand is often simply a matter of comparing resource usage queues (e.g., comparing the queue of instructions to be performed by a CPU for each VM), bandwidth usage is not so easily determined because of the lack of an observable queue or another easily apparent indicator of demand. The lack of a queue or indicator is due, in part, to the fact that the TCP/IP protocol is configured to quickly adapt bandwidth usage to the amount of bandwidth available. Thus, because of the lack of a queue or indicator, a VM will typically remain under-provisioned even after demand is determined and, therefore, bandwidth demand is typically not accurately determined.

SUMMARY

In an embodiment, a method for managing bandwidth allocated to a virtual machine running on a host computer is disclosed. The method involves obtaining the current bandwidth for a virtual machine running on a host computer, determining bandwidth demand for the virtual machine as a function of the current bandwidth and a growth margin, and adjusting a bandwidth cap for the virtual machine based on the determined bandwidth demand. In an embodiment, when applied, the technique allows for bandwidth to be allocated to the virtual machines without the sum of allocated bandwidth exceeding a global bandwidth cap.

In a second embodiment, a non-transitory computer-readable storage medium containing program instructions is disclosed. In the embodiment, execution of the program instructions by one or more processors causes the one or more processors to perform steps that obtain current bandwidth for a virtual machine on a host computer over a TCP communication channel, determine bandwidth demand for the virtual machine as a function of the current bandwidth of the TCP communication channel and a growth margin, and adjust a bandwidth cap for the virtual machine based on the determined bandwidth demand.

In a third embodiment, a computer system having at least one host computing device, the host computing device including a processor and memory for running instantiated virtual machines and a resource management module configured to manage resources among the virtual machines is disclosed. The at least one computing device and the resource management module are configured to obtain current bandwidth for a virtual machine on a host computer over a TCP communication channel, determine bandwidth demand for the virtual machine as a function of the current bandwidth of the TCP communication channel and a growth margin, and adjust a bandwidth cap for the virtual machine based on the determined bandwidth demand.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
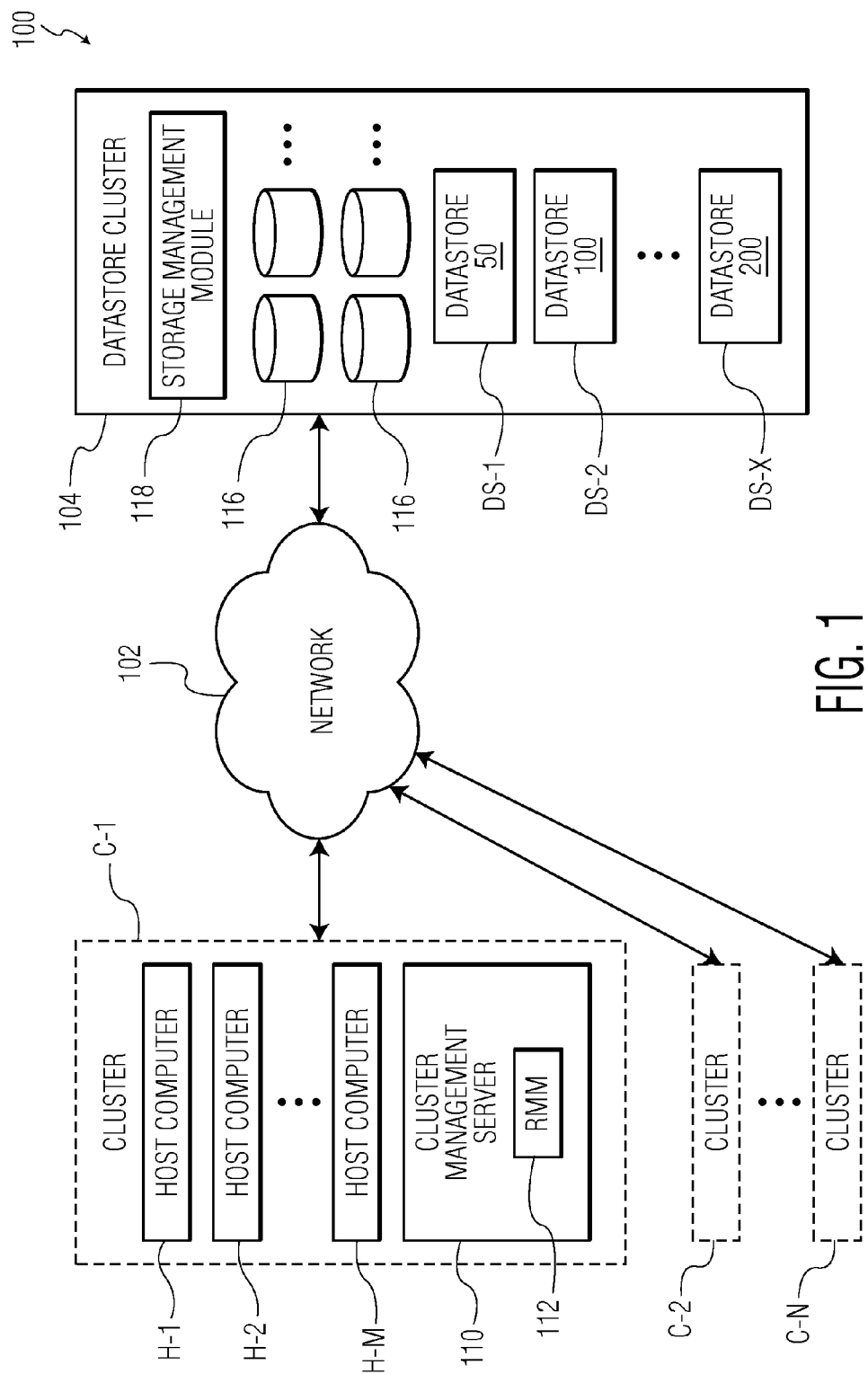
FIG. 1 is a block diagram of a virtual machine network.

Turning now to FIG. 1, a block diagram of a virtual machine network 100 (VM network) is shown. The VM network includes a network 102, clusters C-1, C-2 . . . C-N (where N is a positive integer) of host computers, and a datastore cluster 104. The exact number of host computer clusters included in the distributed computer system can be, for example, from a few clusters to tens of clusters or more. The host computers of the different clusters and the datastore cluster are connected to the network. Thus, each of the host computers in the clusters is able to access the datastore cluster via the network and may share the resources provided by the datastore cluster with the other host computers. Consequently, any process running on any of the host computers may also access the datastore cluster via the network.

In the illustrated embodiment of FIG. 1, each of the clusters C-1, C-2 . . . C-N includes a number of host computers H-1, H-2 . . . H-M (where M is a positive integer) and a cluster management server 110. The number of host computers included in each of the clusters can be any number from, for example, one to several hundred or more. In addition, the number of host computers included in each of the clusters can vary so that different clusters can have a different number of host computers. While at least some of the host computers may be virtualized, in the embodiment of FIG. 1, the host computers are physical computer systems that host or support one or more VMs so that the VMs are executing on the physical computer systems. The host computers may be servers that are commonly found in data centers. As an example, the host computers may be servers installed in one or more server racks. Typically, the host computers of a cluster are located within the same server rack.

Each of the cluster management servers 110 in the clusters C-1, C-2 . . . C-N operates to monitor and manage the host computers H-1, H-2 . . . H-M in the respective cluster. Each cluster management server may be configured to monitor the current configurations of the host computers and the VMs running on the host computers, for example, virtual machines (VMs), in the respective cluster. The monitored configurations may include the hardware configuration of each of the host computers, such as CPU type and memory size, and/or software configurations of each of the host computers, such as operating system (OS) type and installed applications or software programs. The monitored configurations may also include VM hosting information, i.e., which VMs are hosted and running on which host computers. The monitored configurations may also include VM information. The VM information may include the size of each of the VMs, virtualized hardware configurations for each of the VMs, such as virtual CPU type and virtual memory size, software configurations for each of the VMs, such as OS type and installed applications or software programs running on each of the VMs, and virtual storage size for each of the VMs. The VM information may also include resource parameter settings, such as demand, limit, reservation and share values for various resources, e.g., CPU, memory, network bandwidth and storage, which are consumed by the VMs. The demands of the VMs for the consumable resources are determined by the host computers hosting the VMs by monitoring the current usage of resources by the VMs, e.g., CPU processing usage, memory usage, network usage and/or storage usage, and provided to the respective cluster management server.

In some embodiments, the cluster management servers 110 may be implemented on separate physical computers. In other embodiments, the cluster management servers may be implemented as software programs running on a host computer or on virtual computers running on a host computer (now shown). In an implementation, the cluster management servers are VMware vCenter™ servers with at least some of the features available for such servers and each resource management module (RMM) 112 is a VMware Distributed Resource Scheduler™, which provides a Distributed Resource Scheduler (DRS) service as is known in the field.

The network 102 can be any type of computer network or a combination of networks that allows communications between devices connected to the network using, for example, TCP or UDP. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The datastore cluster 104 is used to store data for the host computers of the clusters C-1, C-2 . . . C-N, which can be accessed like any other type of storage device commonly connected to computer systems. In an embodiment, the datastore cluster can be accessed by entities, such as VMs running on the host computers, using any file system, e.g., virtual machine file system (VMFS) or network file system (NFS). The datastore cluster includes one or more computer data storage devices 116, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The datastore cluster includes a storage management module 118, which manages the operation of the datastore cluster. In an embodiment, the storage management module is a computer program executing on one or more computer systems (not shown) of the datastore cluster. The datastore cluster supports multiple datastores DS-1, DS-2 . . . DS-X (where X is a positive integer), which may be identified using logical unit numbers (LUNs). In an embodiment, the datastores are virtualized representations of storage facilities. Thus, each datastore may use resources from more than one storage device included in the datastore cluster. The datastores are used to store data associated with the VMs supported by the host computers of the clusters C-1, C-2 . . . C-N. For virtual machines, the datastores may be used as virtual storage or virtual disks to store files needed by the virtual machines for operation. One or more datastores may be associated with one or more clusters. In an embodiment, the same datastore may be associated with more than one cluster.

Figure 2:
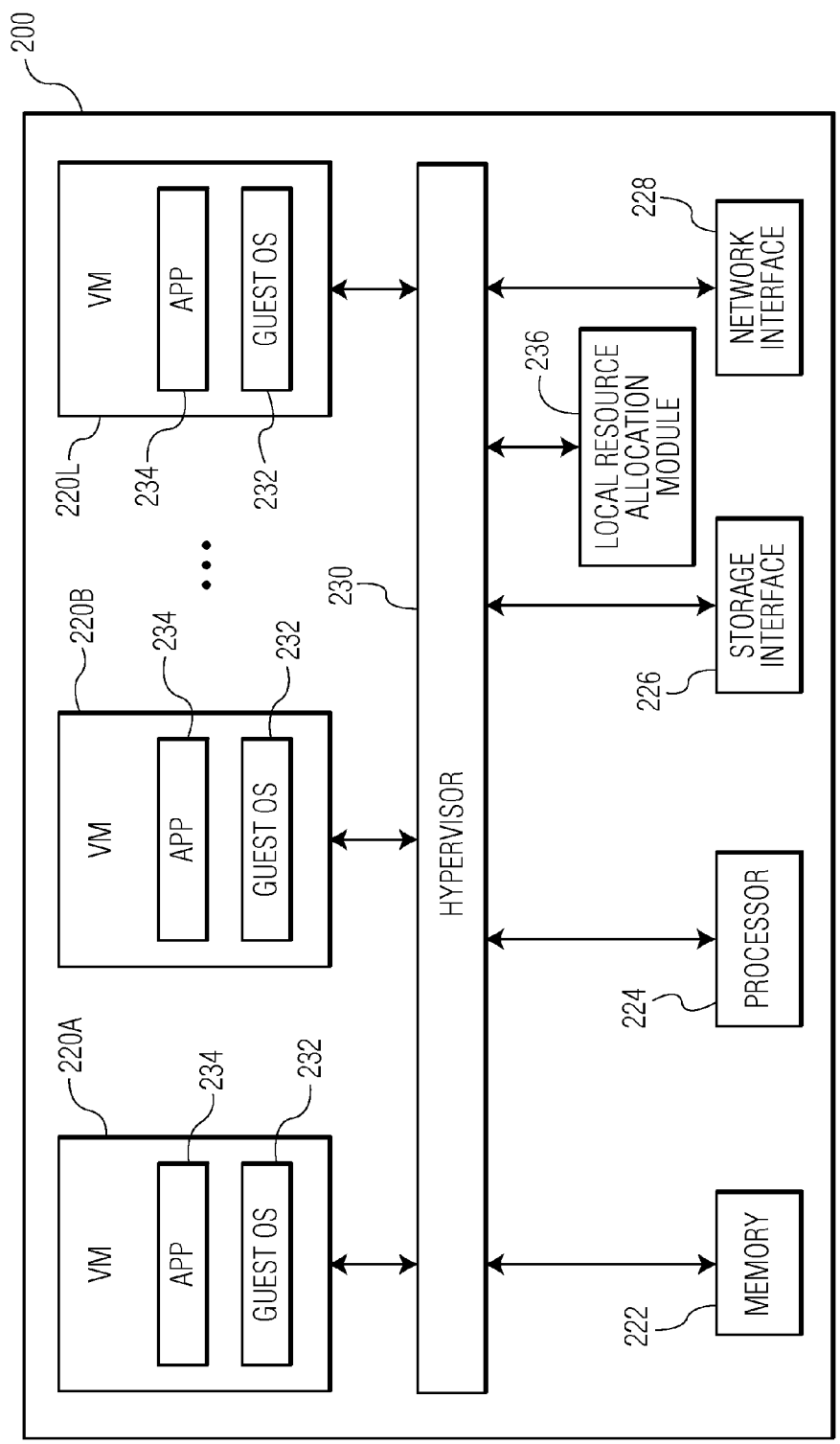
FIG. 2 is a block diagram of a host computer from the virtual machine network of FIG. 1.

Turning now to FIG. 2, components of a host computer 200 that is representative of the host computers H-1, H-2 . . . H-M, are shown. In FIG. 2, the physical connections (e.g., TCP connections) between the various components of the host computer are not illustrated. In the illustrated embodiment, the host computer is configured to support a number of VMs 220A, 220B . . . 220L (where L is a positive integer). The number of VMs supported by the host computer can be anywhere from one to more than one hundred. The exact number of VMs supported by the host computer is limited by the physical resources of the host computer or other constraints such as licensing. The VMs share at least some of the hardware resources of the host computer, which includes system memory 222, one or more processors 224, a storage interface 226, and a network interface 228. The system memory 222, which may be random access memory (RAM), is the primary memory of the host computer. The processor 224 can be any type of processor, such as a central processing unit (CPU) commonly found in a server. The storage interface 226 is an interface that allows the host computer to communicate with the datastore cluster 104 in FIG. 1. As an example, the storage interface may be a host bus adapter or a network file system interface. The network interface 228 is an interface that allows the host computer to communicate with other devices in the cluster as well as devices connected to the network 102 in FIG. 1. As an example, the network interface may be a network adapter. VMs may include a guest operating system 232 and one or more applications 234. The guest operating system is a master control program of the VM and, among other things, forms a software platform on top of which the applications run. In an embodiment, applications are individual programs such as, for example, an email manager, a system logger, or another program with which a user directly communicates.

In the embodiment of FIG. 2, the VMs 220A, 220B . . . 220L run on top of a hypervisor 230 that includes a kernel (not shown) giving the appearance of being distinct from the host computer and from each other. In other embodiments, one or more of the VMs can be nested, i.e., a VM running in another VM. For example, one of the VMs may be running in a VM, which is also running in another VM. The hypervisor may run on top of the host computer's operating system or directly on hardware of the host computer.

Similar to any other computer system connected to the network 102 in FIG. 1, the VMs 220A, 220B . . . 220L shown in FIG. 2 are able to communicate with other computer systems connected to the network using the network interface 228 of the host computer 200. In addition, the VMs are able to access the datastore cluster 104 in FIG. 1 using the storage interface 226 of FIG. 2 of the host computer.

The host computer 200 also includes a local resource allocation module 236 that operates as part of a resource management system, such as a distributed resource scheduler system, to manage resources consumed by the VMs 220A, 220B . . . 220L. The local resource allocation module in each host computer cooperatively operates with the local resource allocation modules in the other host computers of the network computer system 100 to generate resource allocation settings and perform resource scheduling, which includes balancing the loads of software processes, network resource scheduling, and/or storage resource scheduling, among the host computers H-1, H-2 . . . H-M of the host computer clusters C-1, C-2 . . . C-N. Although the local resource allocation module is illustrated in FIG. 2 as being separate from the hypervisor 230, the local resource allocation module may be implemented as part of the hypervisor. In some embodiments, the local resource allocation module is implemented as software programs running on the host computer. However, in other embodiments, the local resource allocation module may be implemented using any combination of software and hardware.

Figure 3:
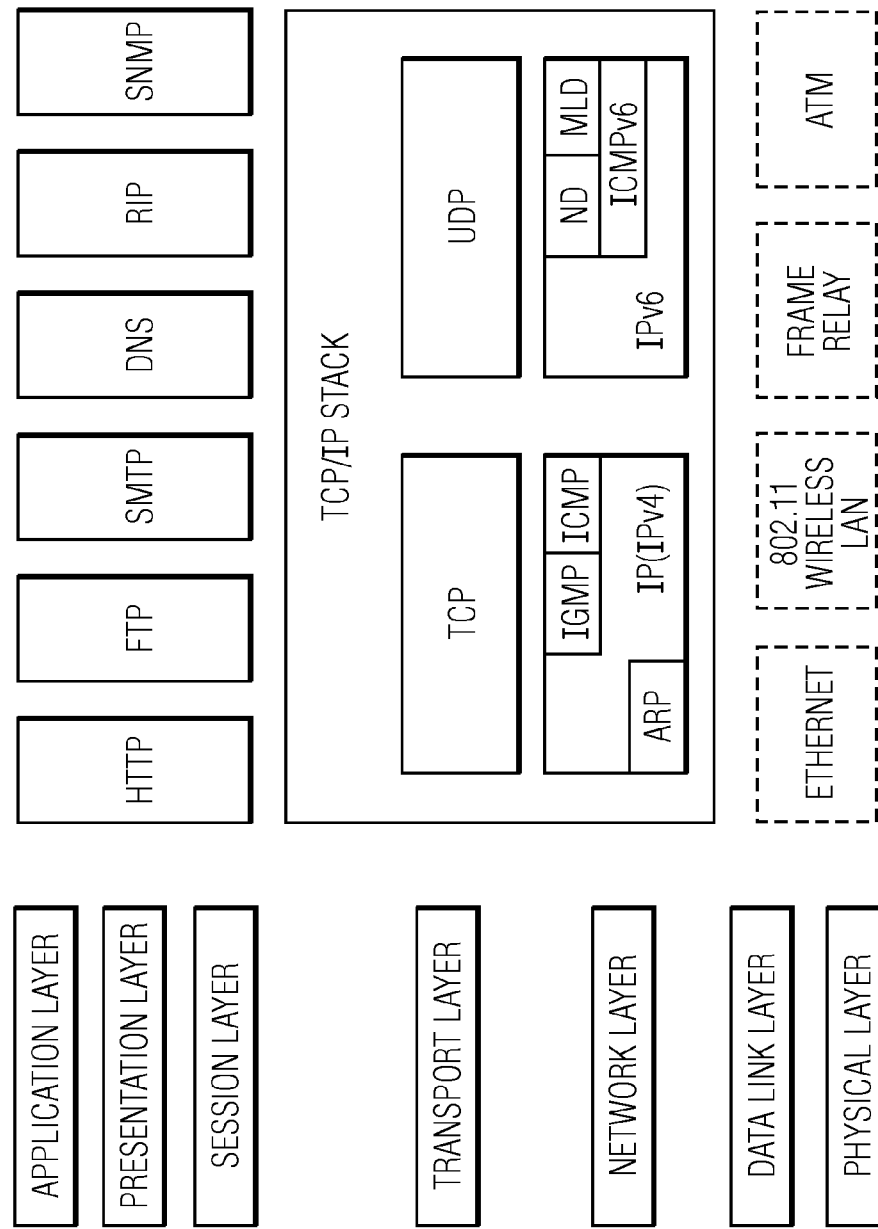
FIG. 3 illustrates well known network layers of the Open Systems Interconnection (OSI) model.

FIG. 3 depicts well known network layers used by the virtual machine network 100 in FIG. 1 as defined by the Open Systems Interconnection (OSI) model. As illustrated, the OSI layers include, from the lowest layer (bottom) to the highest layer (top), the physical layer, the data link layer, the network layer, the transport layer, the session layer, the presentation layer, and the application layer. The physical layer and Data link layer can be referred to as a network interface layer. Protocols included at the network interface layer include Ethernet, 802.11 wireless LAN, Frame Relay, and ATM. Protocols at the network layer include IP (IPv4), Address Resolution Protocol (ARP), Internet Group Management Protocol (IGMP), Internet Control Message Protocol (ICMP), IP version 6 (IPv6), Neighbor Discovery (ND), Multicast Listener Discovery (MLD), and ICMPv6. Protocols at the transport layer include TCP and UDP, and protocols at the session/presentation/application layers include HTTP, File Transfer Protocol (FTP), Simple Mail Transfer Protocol (SMTP), Domain Name System (DNS), Routing Information Protocol (RIP), and Simple Network Management Protocol (SNMP). In an embodiment, the modules, typically software modules, which implement the network layer and transport layer protocols are referred to collectively as the "TCP/IP stack" 300. The modules that implement the network layer and transport layer protocols may also be referred to collectively as the "TCP/UDP/IP stack." In either case, the TCP/IP stack and the TCP/UDP/IP stack are able to implement any of the known network layer and transport layer protocols.

The VM network 100 and host computer 200 described above with reference to FIGS. 1 and 2 can be used to implement a software defined data center (SDDC) that communicates using the TCP/IP stack 300 as described with reference to FIG. 3. VMs in a VM network (e.g., implemented as an SDDC) typically share common resources, as facilitated by, for example, the local resource allocation module 236 of FIG. 2, by allocating to each VM a portion of memory, a portion of CPU clock cycles, and/or a portion of bandwidth based on demand. For example, if a first VM running on a 2.6 GHz multi-core processor-based host computer has a higher demand for processing than a second VM, then the first VM will be allocated 40 MHz of processing power while the second VM will be allocated 20 Mhz of processing power. In another example, a first VM running on a host computer having a 10 Gb/s pNIC can be allocated 4 Gb/s of bandwidth while a second VM running on the host computer can be allocated 2 Gb/s of bandwidth. While allocating shared resources to VMs based on demand is often simply a matter of comparing resource usage queues (e.g., comparing the queue of instructions to be performed by a CPU for each VM), bandwidth usage is not so easily determined because of the lack of an observable queue or other easily apparent indicator of demand. The lack of a queue or an indicator is due, in part, to the fact that the TCP/IP protocol is configured to quickly adapt bandwidth usage to the amount of bandwidth currently allocated to a VM. Thus, because of the lack of an observable queue or other indicator of demand, a VM will typically be perceived as not needing additional bandwidth and will remain under-provisioned even if additional bandwidth is needed.

In an embodiment, bandwidth usage quickly scales to the available bandwidth due to congestion control. Congestion control is a process by which TCP limits the entry of data or packets into a network in order to avoid congestive collapse. In a typical network, the entry of packets into a network is self-regulated because a new packet waits to enter the network until acknowledgment of a previous packet has been received. That is, for each packet received, a new packet is allowed to enter the network.

Figure 4:
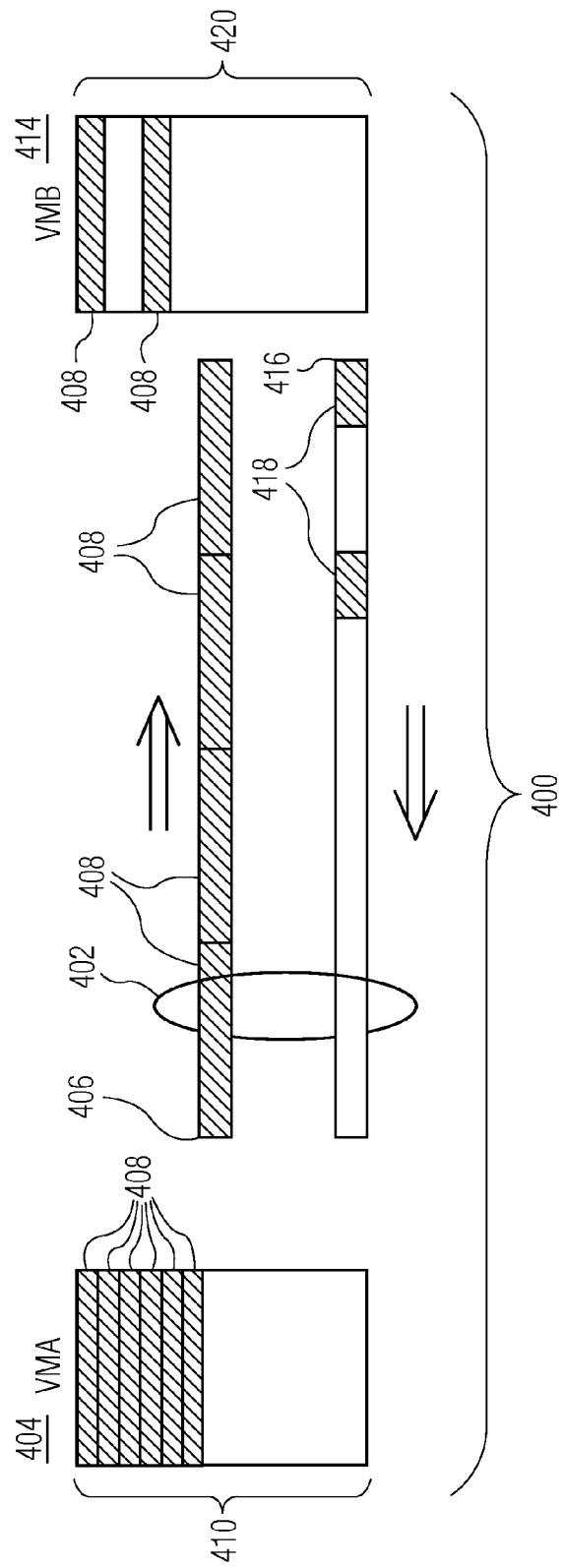
FIG. 4 illustrates a sender VM sending packets over a TCP connection to a receiver VM and the receiver VM sending ACKs back to the sender VM in response.

FIG. 4 illustrates a sender VM 404 sending packets 408 over a TCP connection 402 to a receiver VM 414 and the receiver VM sending ACKs 418 back to the sender VM in response. In particular, FIG. 4 illustrates VM A 404 and VM B 414 (as indicated by transmission queues 410, 420), a TCP connection 402 that is at least partially defined by a top channel 406 and a bottom channel 416, TCP packets 408, and ACKs 418. The sender VM (here, VM A) and the receiver VM (here, VM B) are connected by the TCP connection and handle TCP requests via their respective TCP/IP stacks (not shown). In FIG. 4, the top channel indicates packets from the left transmission queue (VM A) being sent to VM B over the TCP connection. Once a packet is received, the receiver VM places the packet in a transmission queue to be processed, processes the packet, and then sends an ACK back over the TCP connection. In FIG. 4, the bottom channel indicates ACKs (generated in response to processed packets) being sent from VM B to VM A over the TCP connection. Typically, when a packet is sent over the TCP connection, another packet is not sent until an ACK (for the sent packet or for another previously sent packet) is received by the sender VM. For example, in FIG. 4, the next packet in the queue of VM A is not sent over the TCP connection until the ACK indicated by the left-most block in the bottom channel is received by VM A. Thus, congestion control limits the rate at which packets are sent over the TCP connection to a rate at which packets can be received by VM B.

While the rate at which packets are sent over a TCP connection is easily maintained, establishing this rate at startup can be difficult. As part of typical TCP behavior, when a TCP connection between the receiver VM and the sender VM is initialized, the receiver VM will advertise the maximum rate at which the receiver VM can receive packets under perfect network conditions (advertised receiving window). The sender VM then generates TCP packets to be sent over the TCP connection, places the packets in a queue, and sends packets over the TCP connection at a rate based on the advertised receiving window. Typically, the rate at which VM B can receive packets without loss is some amount less than the advertised receiving window, but is initially unknown to VM A and undeterminable by VM A since no ACKs are yet being returned to VM A. For example, if VM B advertises a window of three packets, but is only able to receive two packets without experiencing packet loss due to, for example, network congestion, then the rate at which VM B can receive packets is less than the advertised receiving window. However, because packets have not yet been sent over the connection, VM A is not aware that sending packets at the advertised receiving window rate will result in packets being lost. Thus, despite being aware of the advertised receiving rate of VM B, it is still important for VM A to determine the rate at which packets can be sent over the TCP connection without being lost.

In order to determine a rate at which packets can be sent over a TCP connection without being lost due to, for example, network congestion, TCP typically employs a congestion control strategy. For example, if VM A employs the same strategy as discussed above (i.e., wait for the receipt of an ACK before sending the next packet), the strategy would require VM A to send a packet over the TCP connection and then require VM A to wait for the packet to be received by VM B, for VM B to send an ACK back over the TCP connection, and for VM A to receive the ACK before transmitting the next packet. Thus, only one packet at a time is sent over the TCP connection, resulting in a transmission rate significantly less than may be possible. Alternatively, a strategy referred to as the "slow-start" strategy can be used to determine the rate at which packets can be sent over a TCP connection. The slow-start strategy works by establishing a congestion window at the sending VM and setting the window size to one, thus limiting transmission from the sender to one outstanding packet at a time (i.e., the packet for which the corresponding ACK has not been received). For example, when VM A initially beings to transmit packets, the congestion window is set to one, limiting VM A to sending one packet over the network, and then waiting until the corresponding ACK is received. Each time an ACK is received, the congestion window increases. For example, after the first ACK is received by VM A, VM A doubles the congestion window so that VM A can have two outstanding packets in the network. Initially, the congestion window enters an exponential growth phase and grows exponentially until the congestion window size equals the advertised receiving window or until packet loss occurs. In an embodiment, when packet loss occurs, the size of the congestion window is stored as a slow-start threshold, the congestion window size is reset back to one, and the congestion window enters the exponential growth phase again until the slow-start threshold is reached. Once the congestion window size reaches the slow-start threshold without packet loss, the congestion window enters a linear growth phase and the congestion window increases linearly until packet loss occurs or until the congestion window equals the size of the advertised receiving window. If packet loss occurs, the size of the congestion window is stored as the slow-start threshold, the congestion window size is reset, and the congestion window again enters the exponential growth phase. Thus, by continually increasing or reducing the congestion window, the packet transmission rate can be scaled to, or scaled close to, the maximum transmission rate at which packets can reliably be sent across the network, which is referred to as the "bandwidth." Additionally, if network congestion increases and packet losses begin to occur at a lower transmission rate than the slow-start threshold rate, then, when the congestion window is reset, the slow-start threshold will be set to a lower rate in the exponential growth phase. Thus, the transmission rate can easily be scaled back to the bandwidth of the TCP connection.

Typically, the transmission rate is scaled to the bandwidth of a TCP connection in a network with little to no indication (e.g., an alert or log entry) that the transmission rate has been scaled. For example, if a bandwidth cap is placed on a VM by the local resource allocation module 236 in FIG. 2, then the transmission rate will be scaled down to under the bandwidth cap with little to no indication that the transmission rate has been scaled. However, because of the lack of indication, a VM will typically be perceived as not needing additional bandwidth and will remain under-provisioned even if the transmission rate has recently been reduced because of insufficient bandwidth. In accordance with an embodiment of the invention, the bandwidth needed so that the transmission rate will not be reduced (i.e., bandwidth demand) for a VM running on a host computer is determined as a function of the current bandwidth of a TCP communication channel plus an additional amount of bandwidth (referred to as a "growth margin" or a "buffer"). By determining demand as a function of the current bandwidth of a TCP communication channel plus a growth margin, the perception of the bandwidth demand for a VM will be corrected and additional bandwidth will be allocated to the VM.

In a further embodiment, the growth margin is based on the growth phase of the TCP connection. Typically, the difference between the current bandwidth and the amount of bandwidth needed by a TCP connection in the exponential growth phase is likely greater than the difference between the current bandwidth and the bandwidth needed by a TCP connection in the linear growth phase. For example, a TCP connection in the exponential growth phase measured at 10 Kb/s at one increment may scale up to 10 Mb/s over 5 increments whereas a TCP connection in the linear growth phase measured at 10 Mb/s will scale up to just 12 Mb/s over the same 5 increments. Thus, in an embodiment, a larger growth margin is used for TCP connections in the exponential growth phase than is used for TCP connections in the linear growth phase. For example, the demand of a VM having a TCP connection that has just experienced packet loss due to network congestion and is in the exponential growth phase will be determined using current usage plus a larger growth margin than will be used to determine demand of a VM with a TCP connection not experiencing any packet loss and linearly expanding past its slow-start threshold. Accordingly, the increase in bandwidth allocation when the TCP connection is in the exponential growth phase is greater than the increase in bandwidth allocation when the TCP connection is in the linear growth phase allowing bandwidth allocation to be quickly adapted based on the demand of the VM.

Figure 5B:
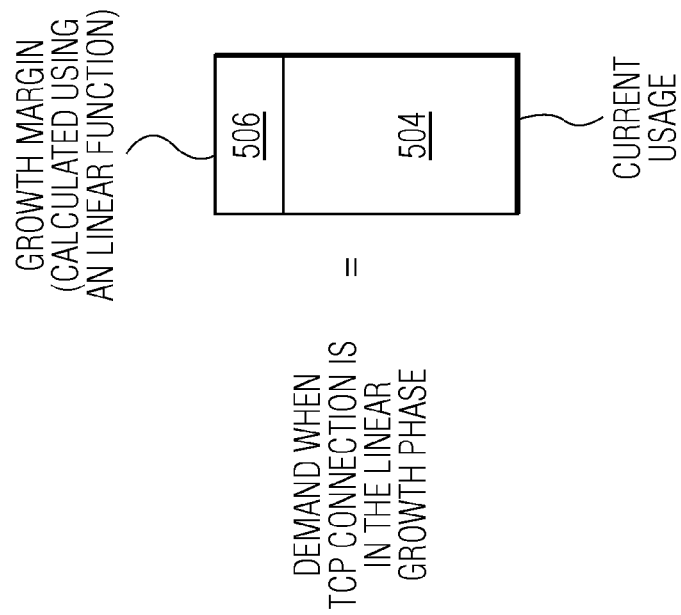
FIG. 5B is an illustration of the determination of bandwidth demand when a TCP connection is in the linear growth phase.
Figure 5A:
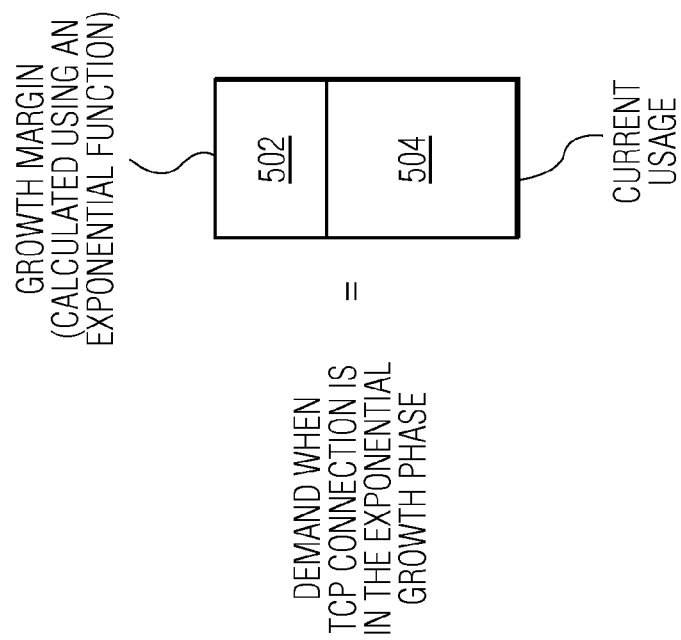
FIG. 5A is an illustration of the determination of bandwidth demand when a TCP connection is in the exponential growth phase.

FIG. 5A is an illustration of the determination of bandwidth demand when a TCP connection is in the exponential growth phase in accordance with an embodiment of the invention. As illustrated in FIG. 5A, bandwidth demand is determined as a function of the current bandwidth of a TCP communication channel 504 plus a growth margin calculated using an exponential function 502. FIG. 5B is an illustration of the determination of bandwidth demand when a TCP connection is in the linear growth phase in accordance with an embodiment of the invention. As illustrated in FIG. 5B, bandwidth demand is determined as a function of the current bandwidth of a TCP communication channel 504 and a growth margin calculated using a linear function 506. In an embodiment, the growth margin calculated using an exponential function is larger than the growth margin calculated using a linear function. The growth margin and corresponding demand can be determined according to the following functions:

$$growthMargin = minBandwidth + \frac{1000}{currentUsage^{exponent}}$$

$$Demand = currentUsage * \left(1 + \frac{growthMargin}{100}\right)$$

where minBandwidth represents the minimum bandwidth needed for the VM to have a steady network connection and the exponent can be varied to achieve different behavior. In an embodiment, a steady network connection is a network connection that a VM can use to send packets over a network without experiencing packet loss due to congestion and the exponent can be set to calculate a growth margin that has an exponential relation to the current usage or a linear relation to the current usage based on the state of the TCP connection. The growth margin can then be used to determine bandwidth demand (i.e., Demand) as indicated above.

In accordance with an embodiment of the invention, once the bandwidth demand has been determined based on the growth margin of the TCP connection, an upper limit on the portion of the total available bandwidth that can be allocated to a VM, referred to as a "bandwidth cap," can be adjusted so that more bandwidth can be allocated to the VM. Thus, once the demand has been determined, the bandwidth cap is increased so that additional bandwidth is allocated to the VM. In an embodiment, according to the above described functions, the bandwidth cap is increased proportionally less at each adjustment increment because, as usage increases, Demand is calculated using a proportionally smaller-sized growth margin.

Figure 6:
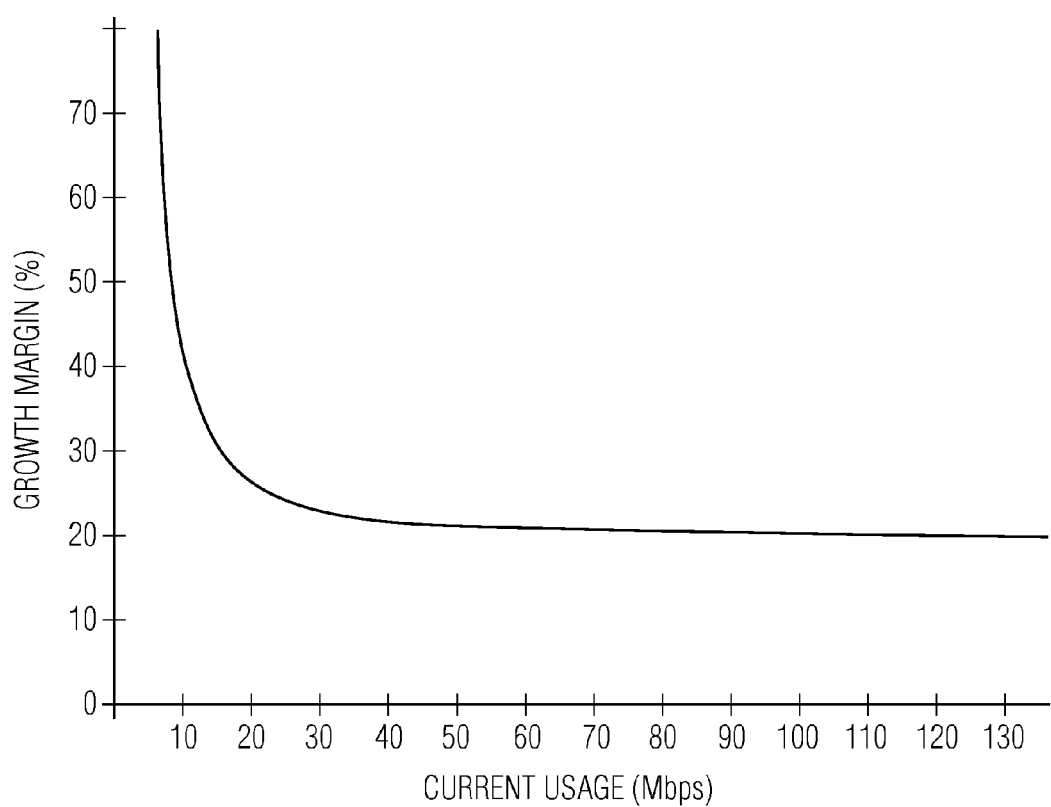
FIG. 6 is a graph of the size of the growth margin used to determine bandwidth demand versus the current usage.

FIG. 6 is a graph of one example of the size of the growth margin used to determine bandwidth demand versus the current usage. Initially, as the usage increases exponentially (e.g., when a TCP connection is in the exponential growth phase), the size of the growth margin compared to the current usage is reduced exponentially down to an asymptote at around twenty percent. For example, in FIG. 6, when the current usage is approximately 10 Mbps, the growth margin is approximately 40% of the current usage (i.e., 4 Mbps), and when the current usage is approximately 50 Mbps, the growth margin is equal to approximately 22% of the current usage (i.e., 11 Mbps). Then, when the usage begins to increase linearly (e.g., when a TCP connection is in the linear growth phase), the growth margin is reduced linearly. For example, in FIG. 6, when the current usage is approximately 50 Mbps, the growth margin is equal to approximately 22% of the current usage (i.e., 11 Mbps), and when the current usage is approximately 100 Mbps, the growth margin is equal to approximately 20% (i.e., 20 Mbps). Thus, when usage is low and exponentially growing, the growth margin will be large compared to the current usage and the adjustment to the bandwidth cap will be a large increase from the current bandwidth cap. However, when usage is high and linearly growing, the growth margin will be small compared to the current usage and the adjustment to the bandwidth cap will be a small increase from the current bandwidth cap. By adjusting the bandwidth cap differently depending on the growth phase of the associated TCP connection, the bandwidth cap can be quickly adjusted to match the bandwidth needed by a VM without excessive delay.

Figure 7:
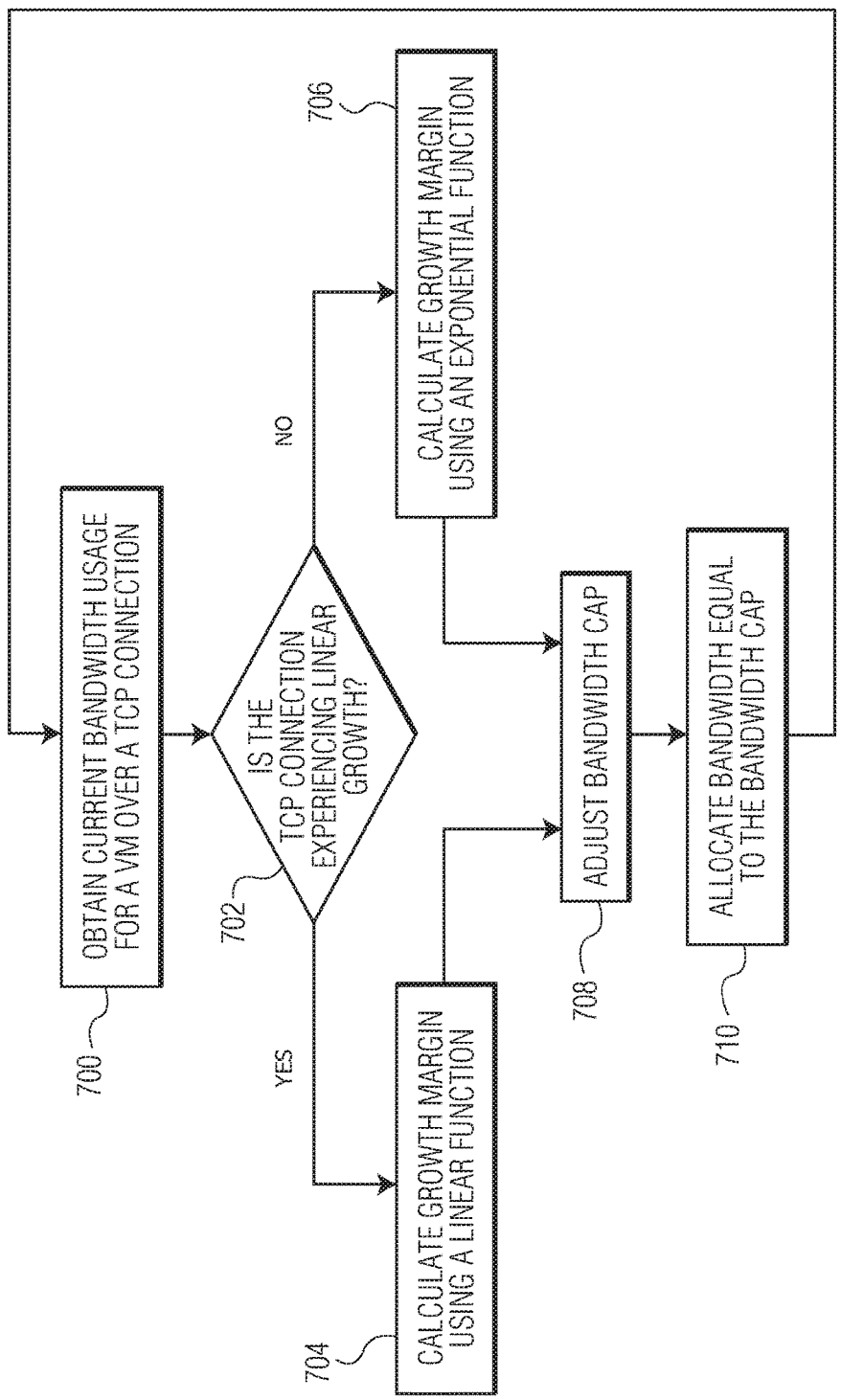
FIG. 7 is a flow diagram of a process used to allocate bandwidth to a VM in accordance with an embodiment of the invention.

FIG. 7 is a flow diagram of a process for managing bandwidth allocated to a VM in accordance with an embodiment of the invention. At block 700, the current bandwidth for a VM over a TCP connection is obtained. For example, current bandwidth for a VM can be obtained by measuring the transmission rate over a TCP connection for the VM. At decision point 702, it is determined if the TCP connection is experiencing linear growth or exponential growth. In an embodiment, if the demand is close to zero and is increasing rapidly, then it is assumed that the TCP connection is experiencing exponential growth and if the demand is stable, then it is assumed that the TCP connection is experiencing linear growth. At block 704, if the TCP connection is experiencing linear growth, then the demand for the VM is determined using a growth margin calculated using a linear function. For example, if the bandwidth usage of the TCP connection has exceeded the slow-start threshold and the usage is growing linearly, then demand is determined using a growth margin calculated using the function, as discussed above, in a linear form. At block 706, if the TCP connection is experiencing exponential growth, then the demand for the VM is determined using a growth margin calculated using an exponential function. For example, if the TCP connection has recently experienced packet loss and the bandwidth usage of the TCP connection has been reset and is expanding exponentially, then demand is determined using a growth margin calculated using the function, as discussed above, in an exponential form. At block 708, the bandwidth cap is adjusted accordingly using the growth margin calculated at either block 704 or block 706. For example, if the growth margin is calculated using an exponential function, then the bandwidth cap will be adjusted to equal the current bandwidth plus the growth margin calculated at block 706. Once the bandwidth cap has been adjusted, at block 710, bandwidth equal to the bandwidth cap is allocated to the VM. In an embodiment, a divvying algorithm (e.g., BPX as described in U.S. patent application Ser. No. 13/779,014 titled "RESOURCE ALLOCATION USING CAPACITY DISTRIBUTION" as filed Feb. 27, 2013) can be used to allocate the bandwidth to the VM. For example, if the bandwidth cap for a VM associated with a resource pool has been adjusted from 12 Mb/s to 20 Mb/s, then the divvying algorithm will be used to determine and allocate bandwidth from the resource pool such that the VM is allocated bandwidth equal to the bandwidth cap. In another embodiment, the divvying algorithm will not allocate bandwidth in excess of a global constraint. For example, if a global constraint caps VM bandwidth allocation at 15 Mb/s, then the divvying algorithm will allocate 15 Mb/s of bandwidth to VMs having a bandwidth cap in excess of 15 Mb/s. After a predefined period of time, the process is repeated to adjust the bandwidth cap as needed. For example, after a 5 second interval, if it is determined that not all of the allocated bandwidth is being used, then the demand will be determined to be a decrease in demand and the bandwidth cap will be adjusted down to the amount of bandwidth that is being used. Thus, bandwidth demand can be determined and resources can be allocated according to the bandwidth demand.

Figure 8A:
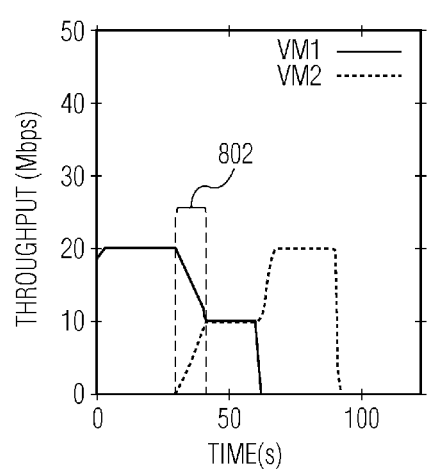
FIG. 8A is a graph of allocated network bandwidth per iteration of the process described with reference to FIG. 7 when the size of the growth margin is determined using exclusively a linear function.
Figure 8B:
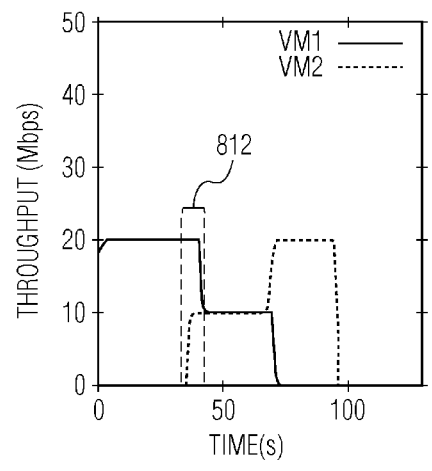
FIG. 8B is a graph of allocated network bandwidth per iteration of the process described with reference to FIG. 7 when the size of the growth margin is determined based on the growth phase of a corresponding TCP connection.

While, in accordance with an embodiment of the invention, bandwidth demand for a VM can be determined using exclusively a linear growth margin, determining bandwidth demand based on the growth phase of a TCP connection corresponding to the VM allows for bandwidth allocation to be more quickly adapted based on the bandwidth demand. That is, using a growth margin based on the growth phase of a TCP connection allows bandwidth allocation to be more quickly adapted based on the bandwidth demand. For example, FIG. 8A is a graph of network bandwidth allocated to VM 1 and VM 2 per iteration of the process described with reference to FIG. 7 when the size of the growth margin is determined using only a linear function. In FIG. 8A, VM 1 and VM 2 share a 20 Mbps TCP connection. Initially, VM1 is allocated 20 Mbps of network bandwidth while VM2 remains idle and is allocated none of the network bandwidth. Over 10 iterations running once every second, as indicated by the dotted lines 802, resources are reallocated from VM1 to VM2 such that both VM1 and VM2 are each allocated 10 Mbps of the network bandwidth. Thus, when using a growth margin determined using only a linear function, bandwidth allocation is adapted over 10 seconds. Alternatively, FIG. 8B is a graph of allocated network bandwidth per iteration of the process described with reference to FIG. 7 when the size of the growth margin is determined based on the growth phase of a corresponding TCP connection. As in FIG. 8A, VM1 and VM2 in FIG. 8B share a 20 Mbps TCP connection. Initially, VM1 is allocated the full 20 Mbps of network bandwidth while VM2 remains idle and is allocated none of the network bandwidth. However, unlike the reallocation shown in FIG. 8A, network bandwidth is reallocated so that VM1 and VM2 each have 10 Mbps of network bandwidth over only 2 iterations, as indicated by the dotted lines 812, because the growth margin, as determined using the process discussed with reference to FIG. 7, causes the bandwidth cap to be adjusted more rapidly. Accordingly, by using a growth margin based on the growth phase of the corresponding TCP connection, bandwidth allocation is adapted over 2 seconds, a fifth of the time required when using only a linear function. Thus, by determining bandwidth demand based on the growth phase of a TCP connection corresponding to a VM, bandwidth allocation can be more quickly adapted based on the bandwidth demand than bandwidth allocation can be adapted using only a linear growth margin.

While the embodiments of the invention discussed herein are described in reference to a single VM, embodiments of the invention can involve multiple VMs running on different host computers within a cluster. In an embodiment, bandwidth can also be allocated to multiple VMs while a global constraint is enforced on the amount of bandwidth that can be allocated to each VM within a cluster. Global constrains include rules such as, for example, a global bandwidth cap or an order in which bandwidth demand is to be met. For example, if a global cap applies to a cluster, then the bandwidth allocated to VMs in the cluster will be limited by the global cap such that the sum of bandwidth allocated to the VMs in the cluster is less than the global cap. In other embodiments, the global cap can be applied to VMs on a single host computer. Additionally, if an order applies, then the full amount of demanded bandwidth may be allocated to some VMs, while other VMs may be allocated less than their demanded bandwidth based on the order.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for managing bandwidth allocated to a virtual machine running on a host computer, the method comprising:
    obtaining current bandwidth for a virtual machine on a host computer over a TCP communication channel;
    determining a growth margin based on a growth phase of the TCP communication channel;
        wherein while the current bandwidth initially increases exponentially in an exponential growth phase of a TCP slow-start, reducing the size of the growth margin exponentially; and
        wherein subsequent to the exponential bandwidth increase and while the current bandwidth increases linearly in a linear growth phase of the TCP slow-start, reducing the size of the growth margin linearly;
    determining bandwidth demand of the TCP communication channel for the virtual machine as a function of the current bandwidth of the TCP communication channel and the growth margin; and
    increasing a bandwidth cap for the virtual machine based on the determined bandwidth demand such that the bandwidth cap is increased proportionally less at each adjustment increment because, as the current bandwidth increases, the bandwidth demand is calculated using a proportionally smaller sized growth margin;
    wherein the bandwidth cap limits a transmission rate for the virtual machine.

2. The method of claim 1, wherein:
    if the TCP connection is experiencing linear growth, then the size of the growth margin is calculated using a linear function; and
    if the TCP connection is experiencing exponential growth, then the size of the growth margin is calculated using an exponential function.

3. The method of claim 1, wherein the TCP communication channel is between two virtual machines running on different host computers.

4. The method of claim 1, wherein the TCP communication channel is between two virtual machines running on the same host computer.

5. The method of claim 1, wherein the TCP communication channel is between a virtual machine and a host computer.

6. The method of claim 1, wherein the current bandwidth is based on the current transmission rate over the TCP communication channel.

7. The method of claim 1, wherein the bandwidth cap is a software-defined limit on the virtual machine.

8. The method of claim 1, wherein the bandwidth cap is further adjusted based on a global constraint.

9. The method of claim 1, wherein determining bandwidth demand comprises limiting the bandwidth demand based on a global cap.

10. A non-transitory computer-readable storage medium containing program instructions, wherein execution of the program instructions by one or more processors causes the one or more processors to perform steps comprising:
    obtaining current bandwidth for a virtual machine on a host computer over a TCP communication channel;
    determining a growth margin based on a growth phase of the TCP communication channel;
        wherein if the current bandwidth increases linearly in a linear growth phase, reducing the size of the growth margin linearly; and
        wherein while the current bandwidth initially increases exponentially in an exponential growth phase of a TCP slow-start, reducing the size of the growth margin exponentially; and
        wherein subsequent to the exponential bandwidth increase and while the current bandwidth increases linearly in a linear growth phase of the TCP slow-start, reducing the size of the growth margin linearly; and
    determining bandwidth demand of the TCP communication channel for the virtual machine as a function of the current bandwidth of the TCP communication channel and the growth margin; and
    increasing a bandwidth cap for the virtual machine based on the determined bandwidth demand such that the bandwidth cap is increased proportionally less at each adjustment increment because, as the current bandwidth increases, the bandwidth demand is calculated using a proportionally smaller sized growth margin;
    wherein the bandwidth cap limits a transmission rate for the virtual machine.

11. The non-transitory computer-readable storage medium of claim 10, wherein:
    if the TCP connection is experiencing linear growth, then the size of the growth margin is calculated using a linear function; and
    if the TCP connection is experiencing exponential growth, then the size of the growth margin is calculated using an exponential function.

12. The non-transitory computer-readable storage medium of claim 10, wherein the TCP communication channel is between two virtual machines running on different host computers.

13. The non-transitory computer-readable storage medium of claim 10, wherein the TCP communication channel is between two virtual machines running on the same host computer.

14. The non-transitory computer-readable storage medium of claim 10, wherein the TCP communication channel is between a virtual machine and a host computer.

15. The non-transitory computer-readable storage medium of claim 10, wherein the current bandwidth is based on the current transmission rate over the TCP communication channel.

16. The non-transitory computer-readable storage medium of claim 10, wherein the bandwidth cap is a software-defined limit on the virtual machine.

17. The non-transitory computer-readable storage medium of claim 10, wherein the bandwidth cap is further adjusted based on a global constraint.

18. The non-transitory computer-readable storage medium of claim 10, wherein determining bandwidth demand comprises limiting the bandwidth demand based on a global cap.

19. A computer system comprising:
at least one host computing device, the host computing device including a processor and memory for running instantiated virtual machines; and
a resource allocation module implemented using at least software programs interpreted by the processor to perform steps to manage resources among the virtual machines comprising;
  obtaining current bandwidth for a virtual machine on a host computer over a TCP communication channel;
  determining a growth margin based on a growth phase of the TCP communication channel;
    wherein while the current bandwidth initially increases exponentially in an exponential growth phase of a TCP slow-start, reducing the size of the growth margin exponentially; and
    wherein subsequent to the exponential bandwidth increase and while the current bandwidth increases linearly in a linear growth phase of the TCP slow-start, reducing the size of the growth margin linearly; and
  determining bandwidth demand of the TCP communication channel for the virtual machine as a function of the current bandwidth of the TCP communication channel and the growth margin; and
  increasing a bandwidth cap for the virtual machine based on the determined bandwidth demand such that the bandwidth cap is increased proportionally less at each adjustment increment because, as the current bandwidth increases, the bandwidth demand is calculated using a proportionally smaller sized growth margin;
  wherein the bandwidth cap limits a transmission rate for the virtual machine.

20. The computer system of claim 19, wherein:
if the TCP connection is experiencing linear growth, then the size of the growth margin is calculated using a linear function; and
if the TCP connection is experiencing exponential growth, then the size of the growth margin is calculated using an exponential function.

21. The computer system of claim 19, wherein the TCP communication channel is between two virtual machines running on different host computers.

22. The computer system of claim 19, wherein the TCP communication channel is between two virtual machines running on the same host computer.

23. The computer system of claim 19, wherein the TCP communication channel is between a virtual machine and a host computer.

24. The computer system of claim 19, wherein the current bandwidth is based on the current transmission rate over the TCP communication channel.

25. The computer system of claim 19, wherein the bandwidth cap is a software-defined limit on the virtual machine.

26. The computer system of claim 19, wherein the bandwidth cap is further adjusted based on a global constraint.

27. The computer system of claim 19, wherein bandwidth demand for the virtual machine is further determined based on a global cap.

* * * * *